United States Patent [19]

Girodin

[11] 4,106,354
[45] Aug. 15, 1978

[54] RECIPROCATING ENGINES, PUMPS OR COMPRESSORS

[76] Inventor: Marius G. Girodin, La Fontaine Peureuse, 78580 Bazemont, France

[21] Appl. No.: 521,201

[22] Filed: Nov. 5, 1974

[30] Foreign Application Priority Data

Nov. 9, 1973 [FR] France .................. 73 39814

[51] Int. Cl.² ............................................. F16H 23/00
[52] U.S. Cl. ................................... 74/60; 91/499
[58] Field of Search ............... 74/60; 91/499; 417/269

[56] References Cited

U.S. PATENT DOCUMENTS

| 1,656,884 | 1/1928 | Dauol | 74/60 |
|---|---|---|---|
| 2,263,561 | 11/1941 | Bierman | 74/60 |
| 2,539,880 | 1/1951 | Wildhaber | 74/60 |
| 2,625,914 | 1/1953 | Pressler | 91/505 |
| 2,737,055 | 3/1956 | Dauben | 74/60 |
| 3,007,462 | 11/1961 | Balzer | 74/60 |
| 3,171,509 | 3/1965 | Girodin | 74/60 |
| 3,552,886 | 1/1971 | Olson, Jr. | 417/269 |

*Primary Examiner*—William L. Freeh
*Attorney, Agent, or Firm*—Lewis H. Eslinger

[57] ABSTRACT

A reciprocating engine, pump or compressor comprises a number of cylinders arranged in an annular array around a central axis. Pistons reciprocable within the cylinders are linked by means of connecting rods to a common swivel member in meshing engagement with a crank. The swivel member is mounted for universal pivotal movement about a point lying on the axis of the array.

10 Claims, 3 Drawing Figures

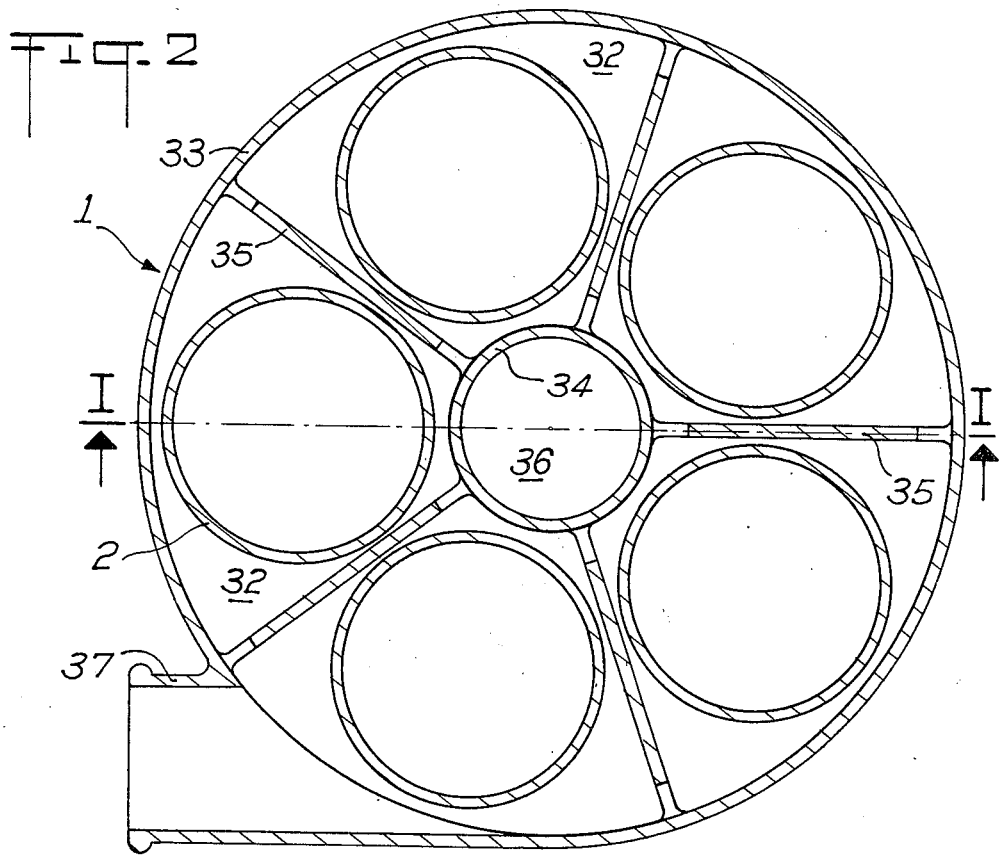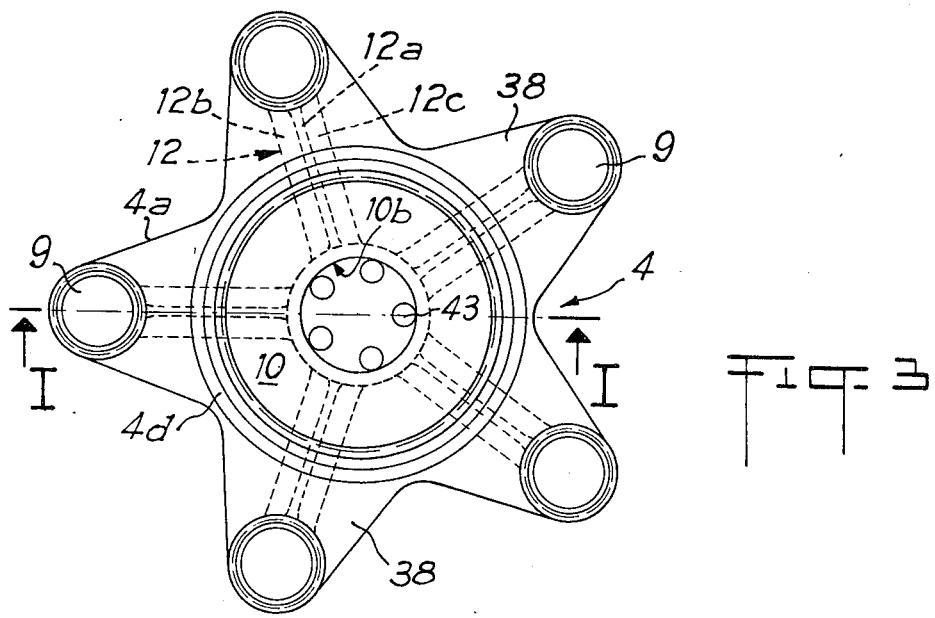

RECIPROCATING ENGINES, PUMPS OR COMPRESSORS

The present invention relates to a machine (engine, pump or compressor) with cylinders disposed revolver-cylinder-wise in a machine casing or block around the axis of the said block of cylinders in such a manner as to have their axes at least substantially parallel with the axis of said block and equidistant from the said axis of said block and one from the other, a machine comprising in addition a rotating shaft disposed co-axially with the axis of the block of cylinders, a movement transformer mounted in the machine casing in such a manner as to be able to perform movement in the manner of a tacking ship, a swivel bearing connecting the widened end of the transformer to the machine casing, pistons mounted axially mobile in the corresponding cylinders, swivelled connecting rods connecting individually a piston on the periphery of the transformer and extending into the machine with a minimum inclination with respect to the rotating shaft, and a connection element between the rotating shaft and the thinned down end of the transformer.

In such a machine, known for example from French Pat. No. 320,874, the rotating shaft is constituted by a crank which passes axially through the movement transformer. This leads to providing for relatively great dimensions for the movement transformer, particularly when the number of cylinders is relatively low, for example less than nine. In this case, in particular, the masses in movement of the transformer and of the rotating shaft are too considerable to permit high rotation speeds. Moreover, in this known machine, the cylinders are disposed on the thinned down side of the movement transformer and the swivel bearing is provided in a part of the machine casing, said part being separate from that which has the cylinders. It follows from this that the path of transmission of the forces between the pistons and the thinned down end of the movement transformer is considerably broken and relatively long; it requires the reinforcement of the transformer to make it resistant to the bending stresses that it suffers. Moreover, the disposing of the shaft inside the swivel requires that the thinned down side of the transformer should be fixed on the curved end of the rotating shaft, and thus leads to a fairly heavy construction.

From French Pat. No. 1,416,219 a machine is known of the above-mentioned type which uses, instead of a swivel bearing, a cardan joint connected to the cylinder block, that is to say to the part of the machine which has the cylinders. The movement transformer is, in this case, constituted by a plate and by a rod perpendicular to said plate, and solid with the centre of the latter, and articulated at its other end on a crank the rotating shaft of which is coaxial with the axis of the machine portion which has the cylinders. By virtue of this design, the rod of the plate suffers constantly alternating bending stresses which cause considerable fatigue to the rod and rapidly bring about the breaking thereof.

The invention has for its object ot obviate these drawbacks and to propose a machine of the type initially mentioned, which permits the transmission of the stresses between the rotating shaft and the pistons along the shortest path, without appreciable fatigue for the intermediate parts.

In a machine of the type initially mentioned, said object is achieved in accordance with the invention as a result of the fact that the widened end of the movement transformer constitutes a portion of the swivel bearing, the other portion of which is solid with the cylinder block, that the rotating shaft is disposed co-axially with the axis of the cylinder block on the side where the thinned down end of the movement transformer is situated, and is connected to said thinned down end by means of a crank solid in rotation with the shaft and having, for the said end, an articulation the axis of which passes through the centre of the swivel bearing, that at least below the articulation of each piston rod the widened end of the movement transformer is connected to the thinned down end by means of a strut, one portion at least of which is situated at least approximately in line with the corresponding piston rod when the corresponding piston is in returned or 'in' position, that the widened end bears a retaining toothed bevel crown concentric with the axis of the transformer and that the cylinder block has a retaining toothed bevel crown coaxial with the axis of said block and adapted to engage, by means of some of its teeth, with at least one tooth situated, at the moment considered, on the area nearest the toothed crown of the transformer.

As a result of this arrangement, the masses in movement are considerably reduced and the transmission of the stresses between the pistons and the rotating shaft takes place along the shortest possible path without overloading the various intermediate parts.

The invention also makes it possible to construct engines, pumps or compressors very light in weight and crankless, still having a very high mechanical output and a reduced number of bearings.

Advantageously, the transformer has the general shape of a truncated cone or pyramid the great base of which has the female or male part of the swivel bearing, and the small base of which is provided with one of the elements of the articulation between the movement transformer and the crank, the elements of said articulation being disposed coaxially with the axis of said transformer.

The transformer is preferably perforated with a number of holes. The element of the articulation solid with the small base of the transformer is constituted by a preferably hollow journal, and the other element solid with the crank is a drilling provided with a slide bearing the axis of which passes through the centre of the swivel bearing. The centre of the articulation between the transformer and the crank is situated approximately along the extension of the struts of the transformer, and at a radial distance from the rotation shaft or from the axis of the cylinder block, in such a manner that the extended axis of the piston rod in returned or 'in' position passes at least in its vicinity, preferably outside in relation to the axis of the cylinder block.

On the side opposite the cylinder block, the rotating shaft is housed in the housing of the machine by means of a slide bearing which is constituted by a spindle and disposed coaxially with the axis of the cylinder block, and the external face of which is capped by the co-axial bore of the crank and acts as a slide bearing for said crank.

The end of the rotating shaft housed in the machine casing has a flange fixed, for example, by means of screws on the crank.

The movement transformer has advantageously a plate which comprises an element of the swivel bearing, a central length of tubing the axis of which passes through the centre of the plate and which is connected with the integrated element of the swivel bearing, and which extends on the side opposite that of the plate having the housings for the swivels of the piston rods, and also comprises at least below each housing for the swivel for piston rod, a strut which extends along the radial plane of the plate, a plane passing through the corresponding rod housing, and which connects the said plate at least at the end of the central tubing, the end away from the plate.

The fixed portion of the swivel bearing, for example the swivel, is fixed to the cylinder block coaxially with the latter, by means of a supporting rod, mounted on the one hand in a central backing piece provided in a central bore of the cylinder block and, on the other hand, in the fixed portion of the swivel bearing.

A method of execution of the invention will be described hereinunder by reference to the attached drawings in which:

FIG. 2 is a cross-section of the cylinder block along line II—II of FIG. 1, and

FIG. 3 is a plan view of the widened end of the movement transformer in the direction of arrow III of FIG. 1.

Figure 1:
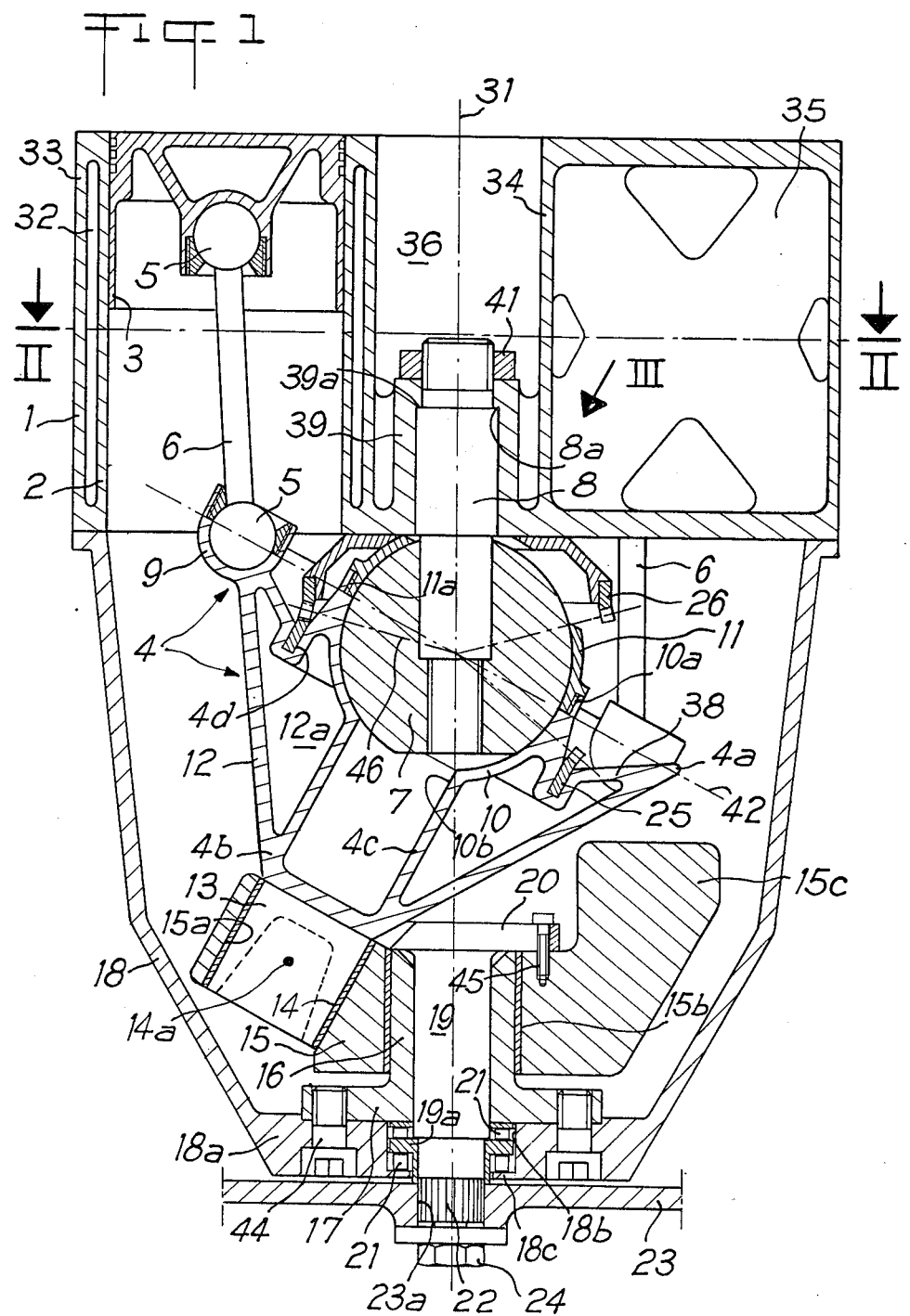
FIG. 1 is an axial cross-section of the machine with cylinders disposed revolver-cylinder-wise, along the radial plane I—I of FIGS. 2 and 3.

On the drawing an engine has been represented without its cylinder head which is not needed to understand the invention. The machine casing or cylinder block 1 has a certain number of hollow cylinders 2, for example five, which are distributed around the central axis 31 of the said block and extend parallel with said axis 31. The cylinders 2 are solid with the cylinder block 1 which has, for each cylinder 2, a cooling chamber 32 delimited by a cylindrical wall 34 and two radial perforated partitions 35 connecting the two walls 33, 34, the internal wall 33 delimiting a central bore 36. The cooling chambers 32 of the adjoining cylinders 2 are in communication with one another and are connected to a cooling circuit by means of connections one of which (37) is shown on FIG. 2.

In the cylinders 2, pistons 3, connected to a movement transformer 4 by means of rods 6 with swivels 5, are movably mounted, in such a manner as to be able to perform alternating movements. The movement transformer 4 is used to transform alternating linear movements applied thereonto at its widened end 4a into a continuous rotary movement performed by its thinned down end 4b or viceversa when the machine operates as a pump or compressor.

The movement transformer 4 has generally the shape of a truncated cone or pyramid. The widened end or great base 4a of the transformer 4 is constituted by a plate, for example with radial arms 38 disposed starwise and having at their free end, that is to say on the periphery of the transformer plate 4a housing or supporting cells 9 for the lower swivels 5 of the piston rods 6. On its widened end side 4a the transformer 4 is suspended on the cylinder block 1 by means of a swivel bearing 7, 10, 11, the fixed part of which, for example the male part or swivel 7, is fixed co-axially with the cylinder block by means of a support rod 8, mounted, on the one hand, in the fixed portion 7 of the swivel bearing 7, 10, 11 and, on the other hand, in a central cylindrical support 39 provided in the central bore 36 of the cylinder block 1, said bore 36 being delimited by the internal cylindrical wall 34 of said clock 1. An upper shoulder 8a of the rod, a counter-shoulder 39a provided on the central support 39 and a nut 41 screwed on the upper threaded portion of the rod 8 prevent any axial displacement of the latter in relation to the cylinder block 1.

In its central portion, plate 4a of the movement transformer 4 is shaped as a spherical cup 10 which constitutes one of the bearing elements of the female portion 10, 11 of the swivel bearing 7, 10, 11. This bearing element 10 surrounds the swivel 7 on one side of the plane 42 passing through the centre of the swivel 7 and those of the lower swivels 5 of the piston rods 6. and acts with the other spherical bearing element 11 for the mobile mounting of the transformer 4 on the swivel 7. The spherical element 11 is mounted, for example by means of the screwing of its thread 11a, in the corresponding threading 10a of the bearing element 10 in such a manner that the swivel 7 is contained, and that only a tacking movement of the transformer 4 about the said swivel 7 be possible. Naturally, in certain applications, and in particular when the swivel has a relatively low mass, the fixed portion of the swivel bearing, a portion solid with the cylinder block 1, may be female, and the mobile portion of the said bearing, a portion solid with the transformer, may be male.

It will be observed in particular with the aid of FIG. 1 that the piston rods 6 are always substantially in a radial plane passing through the axis of the cylinder block 1 and that of the support rod 8, and through the centre of the swivel bearing 7, 10, 11. Moreover, the axes of the piston rods 6 are at least substantially parallel with the merged axes of the block 1 and of the rod 8, or converge slightly towards the said axes in the direction of the thinned down end 4b of the transformer 4 in the retracted position of the pistons.

The transformer 4 has, on the side opposite the cylinders 2 in relation to the plate 4a a central length of tubing 4c the axis of which is perpendicular to the plane 42 passing through the centres of the swivels 5 and 7, and passes through the centres of the plate 4a and of the swivel bearing 7, 10, 11, and which connects with the lower opening 10b of the spherical bearing element 10. The central tube 4c ends in a bottom which constitutes at the same time the thinned down end or small base 4b of the transformer 4 having generally the shape of a truncated cone or pyramid. Below each housing or supporting cell 9, provided in the free end of each arm of the plate 38, a strut 12 is provided which extends essentially in, and on both sides of, a radial plane of the transformer 4, such plane passing through the centre of the corresponding housing cell 9, and which connects the periphery of the widened end or plate 4a at least to the periphery of the thinned down end 4b of the transformer 4, a thinned down end which, in the case of the method of execution represented, is constituted by the bottom of the central tubing 4c. The strut 12 has a T-shaped section the central branch 12a of which extends radially in relation to the axis of the transformer 4 and may, if need be, be perforated and connects to the central tubing 4c and eventually to the bearing element 10, while the side branches 12b, 12c extend on both sides of the central branch 12a following the general pattern of the transformer outline 4.

It will be observed by referring to FIG. 1 that part of the strut 12, that is to say the lateral branches 12b, 12c, is situated at least substantially aligned on the piston rod 6 (situated in the same radial plane) when the corresponding piston 3 is in high position, that is to say in retracted position.

The thinned down end 4b of the transformer 4 is connected with a crank 15 by means of an articulation 13, 14, the axis of which passes through the centre of the swivel bearing 7, 10, 11 and coincides with that of the transformer 4. This articulation 13, 14 comprises a preferably hollow journal 13 fixed, for example, by means of screws 43 on the bottom of the central tubing 4c as well as a slide bearing 15a of the crank 15. As a result of this arrangement, the journal 13 rotates practically without appreciable friction in the bearing 14 housed in the slanting drilling 15a, while it rotates about the axis 31 of the cylinder block 1, the axis of said drilling 15a passing through the centre of the suspension swivel 7.

As may be seen in FIG. 1, the centre 14a of the articulation 13, 14 between the transformer 4 and the crank 15 is situated approximately along the extension of the struts 12 of the transformer 4 and at a radial distance from the axis of the cylinder block 1 such that the extended axis of the piston rod 6 in retracted position passes at least in its vicinity, preferably outside in relation to the axis of the cylinder block 1.

The crank 15 comprises a second bore 15b receiving a slide bearing 16 and disposed coaxially with the axis 31 of the cylinder block 1 and along the extension of the said axis below the transformer 4. The crank 15 is mounted by means of its bore 15b on the slide bearing 16 performing the function, on the one hand, of a spindle for said crank 15 which caps said bearing 16 and, on the other hand, as a housing bearing for a short rotating shaft 19 a large part of which is situated inside said bearing 16. This bearing 16 is disposed coaxially with the cylinder block 1 and is fixed, by its bottom flange 17 and by means of threaded bolts with countersunk head 44, on the bottom 18a of a casing 18 surrounding the crank 15 and the transformer 4, and fixed on the edge of the bottom face of the cylinder block 1.

At the end opposite that provided with the articulation 13, 14 for the transformer 4, the crank 15 has a counterweight 15c and is fixed on the rotating shaft 19 by means of a cross flange 20 solid with the upper end of said shaft 19 and protruding laterally from said shaft beyond the width of the bearing 16, screws 45 connecting said flange 20 to the crank 15 which is thus solid with the shaft 19 both in rotation and in axial displacement.

In the bottom 18a of the casing 18 an opening 18b is made, coaxial with the cylinder block, the rotating shaft going through it; said opening houses a double abutment 21 between which an abutment ring 19a is held solid with the shaft 19, said double abutment 21 resting, on the one hand, on a shoulder 18c of the opening 18b and, on the other hand, on the inner edge of the flange 17 of the bearing 16.

In the example represented, the short shaft 19 ends outside the casing 18 by means of grooves 22 which engage into the corresponding flutings made in the central bore 23a of a clutch plate 23, locked against a shoulder of the shaft 19 with the aid of a nut 24.

The rotation of the widened end or plate 4a of the transformer 4 is prevented by means of a gear 25, 26 which is composed of a retaining toothed bevel crown 25 coaxial with the transformer 4 and solid with the plate 4a and of a retaining toothed bevel crown 26 coaxial with the cylinder block 1 and fixed on the lower face of the latter, the teeth of one of the crowns facing those of the other. As may be seen in FIG. 1, the teeth of the high portion of the crown 25 solid with the transformer 4 engage with some of the teeth of the toothed crown 26 of the cylinder block 1, it being understood that the high portion of the crown 25, changes position continually as a function of the position of the transformer 4 the plate 4a of which is prevented from rotating by the gear 25, 26.

Between the inner end of the radial arms 38 and the bearing element 10, the plate 4a of the transformer 4 has a coaxial annular groove 4d in which the foot of the crown 25 is mounted, of which the teeth only protrude from the said groove 4d. Naturally, the radius 46 passing through the gearing point of the crowns 25, 26, passes also through the centre of the suspension swivel 7 and describes a cone.

The modus operandi of a machine of the type described is known to the man skilled in the art and does not require any special explanations. The machine may operate as an engine, or pump, or compressor, depending on whether the rotating shaft is used as an output shaft or as an input shaft.

What is claimed is:

1. A machine comprising a cylinder block having a plurality of cylinders disposed around the axis of the block with the axes of the cylinders being at least substantially parallel with the axis of said block, a hollow casing secured to said block in generally axial alignment therewith, said cylinders being positioned equidistant from the said axis of said block and from each other, a straight rotating shaft rotatably mounted in said casing disposed co-axially with the axis of the block, a movement transformer mounted in said casing and having a widened end and an opposed reduced end, a swivel bearing swivelably connecting the widened end of the transformer to the block, pistons mounted in the cylinders, swivelled connecting rods individually and swivelably connecting each piston to the periphery of the transformer, a connection element located between said rotating shaft and the reduced end of the transformer, the widened end of the movement transformer constituting a portion of the swivel bearing, the other portion of which is rigid with the cylinder block, and said straight rotating shaft being disposed in said casing co-axially with the axis of the cylinder block adjacent to the reduced end of the movement transformer, said connecting element comprising crank means for connecting the shaft to the said reduced end, said crank means being secured to the shaft for rotationg therewith and having articulation means for rotatably receiving said reduced end of the transformer, with the axis of said articulation means passing through the center of the swivel bearing, strut means associated with each of said pistons for connecting the widened end of the movement transformer to the reduced end, one portion at least of said strut means being situated at least approximately in line with a respective connecting rod when its associated piston is in its innermost position in its cylinder, toothed bevel gear concentric with the axis of the transformer and carried within the widened end thereof, and a toothed bevel gear coaxial with the axis of said block and located to engage with at least one tooth of the toothed gear of the transformer.

2. A machine according to claim 1, wherein the transformer has the general shape of a truncated cone or pyramid, said articulation means being disposed coaxially with the axis of said transformer.

3. A machine according to claim 1, wherein said strut means define perforations in the periphery of the transformer.

4. A machine according to claim 1, wherein the articulation means comprises a journal rigid with the reduced end of the transformer, and slide bearing means rigid with the crank means and engaging said journal, the axis of said slide bearing means passing through the center of the swivel bearing.

5. A machine according to claim 1, wherein the center of said articulation means between the transformer and the crank means is situated approximately along the extension of the struts of the transformer, and at a radial distance from the axis of the cylinder block, such that the axis of the connecting rod, when its associated piston is in its innermost position, passes at least in its vicinity, preferably outside in relation to the axis of the cylinder block.

6. A machine according to claim 1, wherein the transformer has a plate which comprises an element of the swivel bearing, and a central tubular portion the axis of which passes through the center of the plate and which is connected with the plate, said machine further comprising swivel housings, and swivels on the connecting rod and located in the housings, said housings being located on one side of the plate and the central tubular portion being located on the opposite side of the plate, said transformer further comprising, at least below each housing, a strut which extends along the radial plane of the plate, and in a plane passing through the corresponding housing, and which connects the said plate at least to the end of the tubular portion remote from the plate.

7. A machine according to claim 1, wherein the swivel bearing comprises a supporting rod having a fixed portion fixed to the cylinder block coaxially along with the latter by means of the supporting rod against axial movement, said cylinder block having a central bore which receives the supporting rod.

8. A machine according to claim 1, wherein the transformer comprises a plate having an annular groove which receives said toothed gear.

9. A machine according to claim 1, further comprising slide bearing means for said shaft, said slide bearing means comprising a spindle disposed coaxially with the axis of the cylinder block, said spindle having an external face and said crank means having a bore which caps said external face whereby said face acts as a slide bearing for said crank.

10. A machine according to claim 9, wherein the end of the rotating shaft is housed in the casing and has a flange fixed on the crank.

* * * * *